US008189780B2

(12) United States Patent
Matsumoto et al.

(10) Patent No.: US 8,189,780 B2
(45) Date of Patent: May 29, 2012

(54) CONTENT PROTECTION SYSTEM (75) Inventors: Tomoyuki Matsumoto, Chiba (JP); Junji Mitani, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1347 days.

(21) Appl. No.: 11/795,753

(22) PCT Filed: May 12, 2005

(86) PCT No.: PCT/JP2005/008688
§ 371 (c)(1),
(2), (4) Date: Jul. 20, 2007

(87) PCT Pub. No.: WO2006/080098
PCT Pub. Date: Aug. 3, 2006

(65) Prior Publication Data
US 2008/0168488 A1    Jul. 10, 2008

(30) Foreign Application Priority Data
Jan. 26, 2005    (JP) ................................. 2005-018407

(51) Int. Cl.
*H04N 7/167*    (2006.01)
(52) U.S. Cl. .......... 380/210; 380/211; 380/212; 725/31; 713/154; 726/22; 370/535; 370/536
(58) Field of Classification Search ................. 380/211, 380/210, 212; 725/31; 713/154; 726/22; 370/535, 536
See application file for complete search history.

(56) References Cited

U.S. PATENT DOCUMENTS

| 5,754,651 A | 5/1998 | Blatter et al. |
| 6,178,244 B1 * | 1/2001 | Takeda et al. ................. 380/277 |
| 6,594,361 B1 | 7/2003 | Chaney et al. |
| 6,643,298 B1 * | 11/2003 | Brunheroto et al. .......... 370/537 |
| 6,654,423 B2 * | 11/2003 | Jeong et al. .............. 375/240.29 |

(Continued)

FOREIGN PATENT DOCUMENTS
JP    09-036914    2/1997
(Continued)

OTHER PUBLICATIONS

EP Supp. Search Report mailed Feb. 16, 2009 in corresponding EP application 05738921.5.

(Continued)

*Primary Examiner* — April Shan
(74) *Attorney, Agent, or Firm* — Nixon & Vanderhye P.C.

(57) ABSTRACT

The digital broadcast receiver comprises: a signal input unit for receiving a received broadcast wave; a demodulation unit for demodulating the broadcast wave; an external module; an external module I/F (Interface) for connecting the receiver to the external module; a decoding unit for extracting necessary information containing a target content from the received signal; an output unit for outputting actual video/audio; a control unit for controlling the entire receiver; and a user I/F for transmitting and receiving information to/from a user. Further, there are provided: a packet processing unit that is located between the demodulation unit and the external module I/F, that monitors all the packets contained in a TS, and that performs a predetermined processing on packets matched with a predetermined condition; and a TS selector that is located between the external module I/F and a bus line and that selects and outputs one designated TS of the two TSs. In this way, non-encrypted contents can be protected with ease when the TS outputted to the external module is accessed in an unauthorized way.

11 Claims, 7 Drawing Sheets

U.S. PATENT DOCUMENTS

| | | | |
|---|---|---|---|
| 6,996,101 B2 * | 2/2006 | Coupe et al. | 370/389 |
| 7,062,048 B2 * | 6/2006 | Livaditis et al. | 380/241 |
| 7,162,642 B2 * | 1/2007 | Schumann et al. | 713/189 |
| 7,280,475 B2 * | 10/2007 | Tanaka et al. | 370/235 |
| 7,315,491 B2 * | 1/2008 | Takaoka et al. | 369/44.26 |
| 7,397,920 B2 | 7/2008 | Hamada | |
| 7,463,586 B2 * | 12/2008 | Tanaka et al. | 370/235 |
| 7,478,415 B1 * | 1/2009 | Takeuchi | 725/42 |
| 7,562,999 B2 * | 7/2009 | Chen | 362/239 |
| 7,580,522 B2 * | 8/2009 | Kangas | 380/210 |
| 2001/0002907 A1 * | 6/2001 | Jeong et al. | 370/392 |
| 2002/0064189 A1 | 5/2002 | Coupe et al. | |
| 2002/0080963 A1 | 6/2002 | Hamada | |
| 2002/0176512 A1 * | 11/2002 | Tanaka et al. | 375/295 |
| 2002/0194613 A1 | 12/2002 | Unger | |
| 2003/0169649 A1 * | 9/2003 | Takaoka et al. | 369/44.26 |
| 2003/0189957 A1 * | 10/2003 | Misu et al. | 370/536 |
| 2004/0049688 A1 * | 3/2004 | Candelore et al. | 713/191 |
| 2004/0123094 A1 * | 6/2004 | Sprunk | 713/150 |
| 2004/0218906 A1 | 11/2004 | Chaney | |
| 2004/0247122 A1 * | 12/2004 | Hobrock et al. | 380/241 |
| 2005/0018711 A1 | 1/2005 | Kudo et al. | |
| 2007/0008838 A1 * | 1/2007 | Takaoka et al. | 369/44.26 |
| 2007/0253509 A1 * | 11/2007 | Tanaka et al. | 375/295 |

FOREIGN PATENT DOCUMENTS

| | | |
|---|---|---|
| JP | 2000-511019 | 8/2000 |
| JP | 2002-124884 | 4/2002 |
| JP | 2002-312314 | 10/2002 |
| JP | 2005-012564 | 1/2005 |
| JP | 2005-515726 | 5/2005 |
| WO | 03/085985 A2 | 10/2003 |
| WO | 2004/045213 A2 | 5/2004 |

OTHER PUBLICATIONS

Chinese Office Action w/English translation dated Dec. 24, 2010 (4 pages).

* cited by examiner

CONTENT PROTECTION SYSTEM

This application is the US national phase of international application PCT/JP2005/008688 filed 12 May 2005, which designated the U.S. and claims priority to JP 2005-018407 filed 26 Jan. 2005, the entire content of each of which is hereby incorporated by reference.

TECHNICAL FIELD

The present invention relates to digital-content receiving systems and digital-content reproducing systems.

BACKGROUND ART

In digital broadcasting, for example, in order to prevent a pay content from being watched or listened to in an unauthorized manner, it is often the case that a transmitting side performs encryption processing on content data and then transmits the data. In order to watch or listen to the thus encrypted content, generally, a receiving side needs to perform a decryption processing in accordance with a predetermined method with a key given by the transmitting side.

In order to make a method for decrypting such encrypted content in the form of a black box and to accommodate cases in which security based on encryption is broken with an update of an external module alone, instead of the entire receiver, there is a system in which decryption processing is performed by an external module provided outside the receiver (see Patent Document 1, for example).

Figure 9:
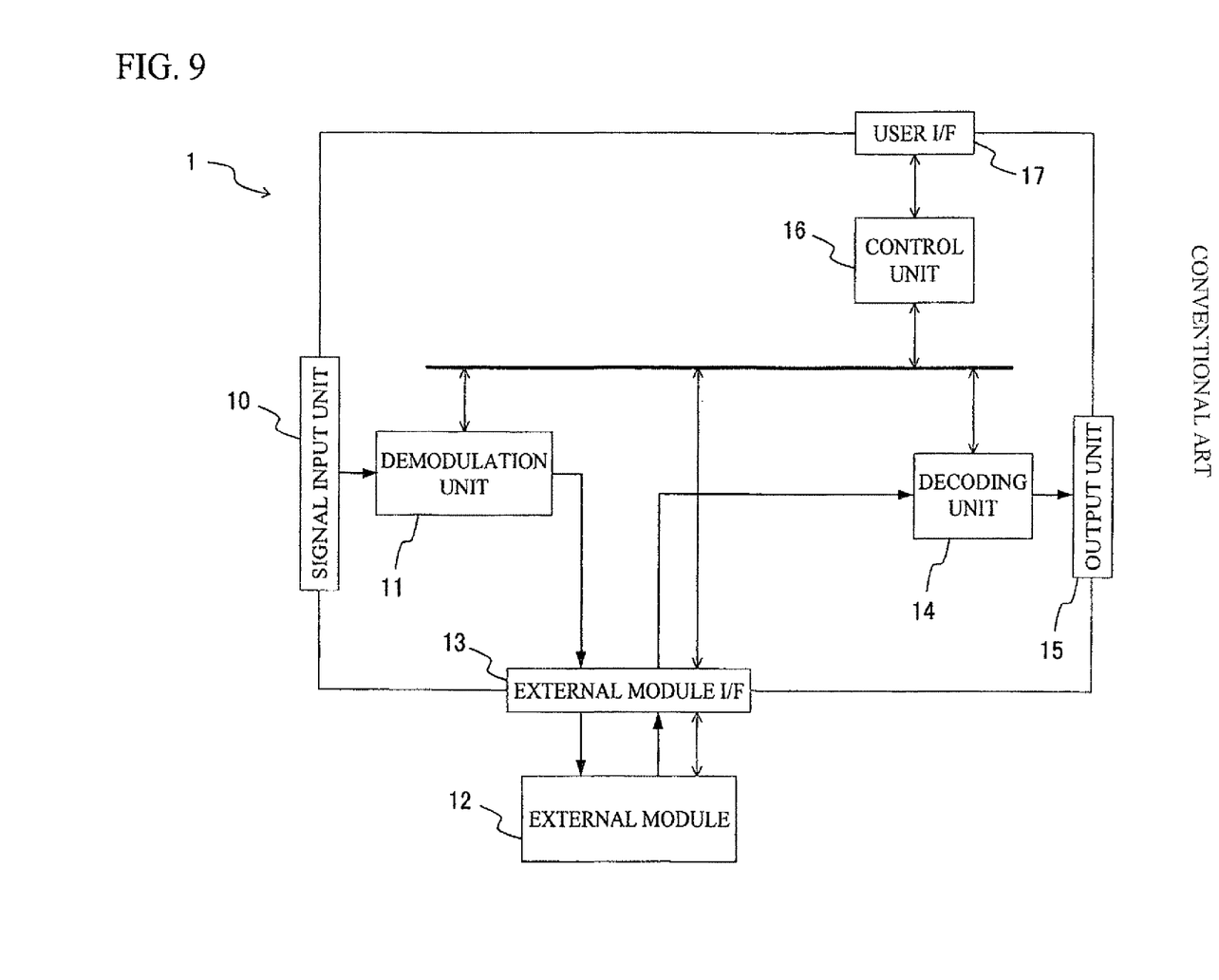
FIG. 9 shows a functional block diagram of a structure of a conventional digital broadcast receiver provided with an interface to an external module.

FIG. 9 shows a conventional structural example of a digital broadcast receiver 1 using an external module 12. As shown in FIG. 9, the digital broadcast receiver 1 comprises: an input unit 10 for receiving a received broadcast wave; a demodulation unit 11 for demodulating the broadcast wave; an external module 12; an external module I/F (Interface) 13 for connecting the receiver 1 to the external module 12; a decoding unit 14 for extracting necessary information containing a target content from the received signal; an output unit 15 for outputting actual video/audio; a control unit 16 for controlling the entire receiver 1; and a user I/F 17 for transmitting and receiving information to/from a user.

Based on the digital broadcast receiver 1, first, an RF (Radio Frequency) signal received by an external antenna or the like is inputted to the input unit 10, necessary information is obtained from the control unit 16 so as to obtain a desired content designated by the user I/F 17, a target channel is demodulated by the demodulation unit 11, and a TS (Transport Stream) containing the desired content is extracted.

Next, the TS that has passed through the external module 12 is obtained via the external module I/F 13. At this point, since the external module 12 performs decryption processing on the encrypted content designated by the control unit 16, necessary information, such as the TS inputted from the external module I/F 13 or a key for decryption via the control unit 16, is obtained. Next, another encryption processing is performed on the decrypted target content, and the content is then outputted to the external module I/F 13. Further, key information for decryption is transmitted to the control unit 16.

The decoding unit 14 performs decryption processing and the decoding of the TS by obtaining the key information from the control unit 16 and channel selection information for extracting the target content from the TS, and the output unit 15 outputs video/audio. Further, information such as a program list obtained from the TS in the decoding unit 14 is transmitted to the control unit 16.

Patent Document 1: JP Patent Publication (Kokai) No. 2002-312314 A

DISCLOSURE OF THE INVENTION

Problems to be Solved by the Invention

Based on the digital broadcast receiver 1 according to the above conventional technology, in order to output the TS to the external module 12; that is, to the outside of the receiver 1, a signal between the external module 12 and the external module I/F 13 is extended and branched, and in this way, the TS itself can be relatively easily extracted. Since there are cases in which non-encrypted contents are contained in the contents contained in the TS, if these non-encrypted contents are extracted to the outside, for example, there is a possibility that unauthorized copies could be distributed or unauthorized description on the Internet could be conducted.

Further, an attempt at an unique encryption processing on non-encrypted contents before an output is produced from the external module I/F 13 requires complex processing, resulting in an increase in the load of the receiver and in the cost. Additionally, since such encryption processing cannot be accommodated by updating an external module alone but requires the entire receiver, it is difficult to accommodate cases in which security based on encryption processing is broken. It is an object of the present invention to provide a simple technique for protecting non-encrypted contents when a TS outputted to an external module is accessed in an unauthorized way.

Means for Solving the Problems

Generally, a plurality of contents are multiplexed in a TS, and each of the contents is divided into units referred to as packets, and the contents are separately located in the TS. Each of the packets of identical original data is provided with an identical 13-bit ID referred to as a PID (Packet IDentifier), and in this way, the packets are distinguished from each other. Thus, by rewriting the PIDs of a particular content as invalid values, acquisition of the content can be prevented.

Meanwhile, since the external module performs processing on only the encrypted contents, non-encrypted contents are unnecessary data. Thus, it is not problematic to extract and invalidate the packets of the non-encrypted contents multiplexed in the TS, before the received TS is outputted to the external module. Further, the encrypted contents and non-encrypted contents can be distinguished by obtaining the values of the flags for each packet.

Further, for the receiver side, those contents other than the contents to be watched or listened to; that is, contents that are not to be watched or listened to, are unnecessary data. Thus, when encrypted contents are watched or listened to, it is not problematic to decode the TS in which non-encrypted contents are invalidated and that is obtained through the external module.

Further, when non-encrypted contents are watched or listened to, since the TS does not need to pass through the external module, the TS prior to the packet invalidation processing can be decoded without causing it to pass through the external module.

Namely, one aspect of the present invention provides a content receiving apparatus for outputting to the outside at least part of a content composed of digital data inputted from the outside. The content receiving apparatus comprises: means for determining at least part of attribute information about the digital data; means for invalidating identification information about the digital data; and means for invalidating identification information about the digital data having attribute information matched with a designated condition before an output is produced to the outside.

Further, the present invention provides a content receiving apparatus for outputting to the outside at least part of a content composed of a digital signal in which digital data inputted from the outside is multiplexed. The content receiving apparatus comprises: means for determining at least part of attribute information about the digital data multiplexed in the digital signal; means for invalidating identification information about the digital data multiplexed in the digital signal; and means for invalidating identification information about the digital data having attribute information matched with a designated condition before an output is produced to the outside.

It is preferable that the apparatus comprise: means for reentering a digital signal that has once been outputted to an external apparatus; means for extracting a target digital data from the signal multiplexed in the digital signal; and means for conducting a switching between at least part of the digital signal reentered and the digital signal before conversion into invalid data, and that the switching of the digital signal be controlled based on an attribute about the target digital data that is to be extracted. Herein, the "switching of the digital signal" corresponds to, for example, the processing by a TS selector 102 in FIG. 1 and the processing in a step 205 in FIG. 2, which will be described later. The present invention includes processing that exerts such control that an output of digital data to the decoder is switched. Specifically, in cases in which the presence or absence of encryption is the "attribute" of the target to be controlled, when the purpose is to decode (watch or listen to) encrypted digital data (content), the digital data is outputted via the external module. On the other hand, when the purpose is to decode (watch or listen to) non-encrypted digital data (content), the digital data is directly outputted from the demodulation unit.

Effects of the Invention

According to an aspect of the present invention, as a condition for determining whether a packet is subjected to invalidation processing, determination of encryption/non-encryption is made on a packet-by-packet basis. By invalidating non-encrypted packets alone, when the TS outputted to the external module is accessed in an unauthorized manner, unprotected non-encrypted contents can be protected.

Further, by designating the PIDs of a particular content and invalidating those packets, it becomes possible to prevent the extraction of an arbitrary content in an unauthorized manner, irrespective of encryption/non-encryption.

In contrast, by designating the PIDs other than those of a particular content and invalidating those packets, it becomes possible to prohibit unauthorized use of the contents other than the target content; that is, all the unnecessary contents contained in the TS.

Further, by using a combination of the invalidation processing performed on particular packets due to PID designation or on the packets other than the particular packets and the invalidation processing performed on non-encrypted packets, when invalidating non-encrypted contents, it becomes possible not to invalidate non-encrypted packets other than the contents, such as information for selecting channels or program information, as exceptions. Further, when particular contents alone are invalidated, it becomes possible not to invalidate encrypted packets as exceptions. Thus, contents can be protected without causing a deficiency of necessary information in the external module or the decoding unit.

Furthermore, by performing the invalidation processing on contents to which disadvantages could be caused due to unauthorized access on a packet-by-packet basis, a content protection system in which increase in processing load or cost is reduced is easily established.

BEST MODES FOR CARRYING OUT THE INVENTION

The present invention is based on a patent application No. 2005-018407 filed with the Japan Patent Office on Jan. 26, 2005, all the content of which is incorporated herein.

A content protection system according to an embodiment of the present invention will be described hereafter with reference to the drawings.

(Description of the System as a Whole)

Figure 1:
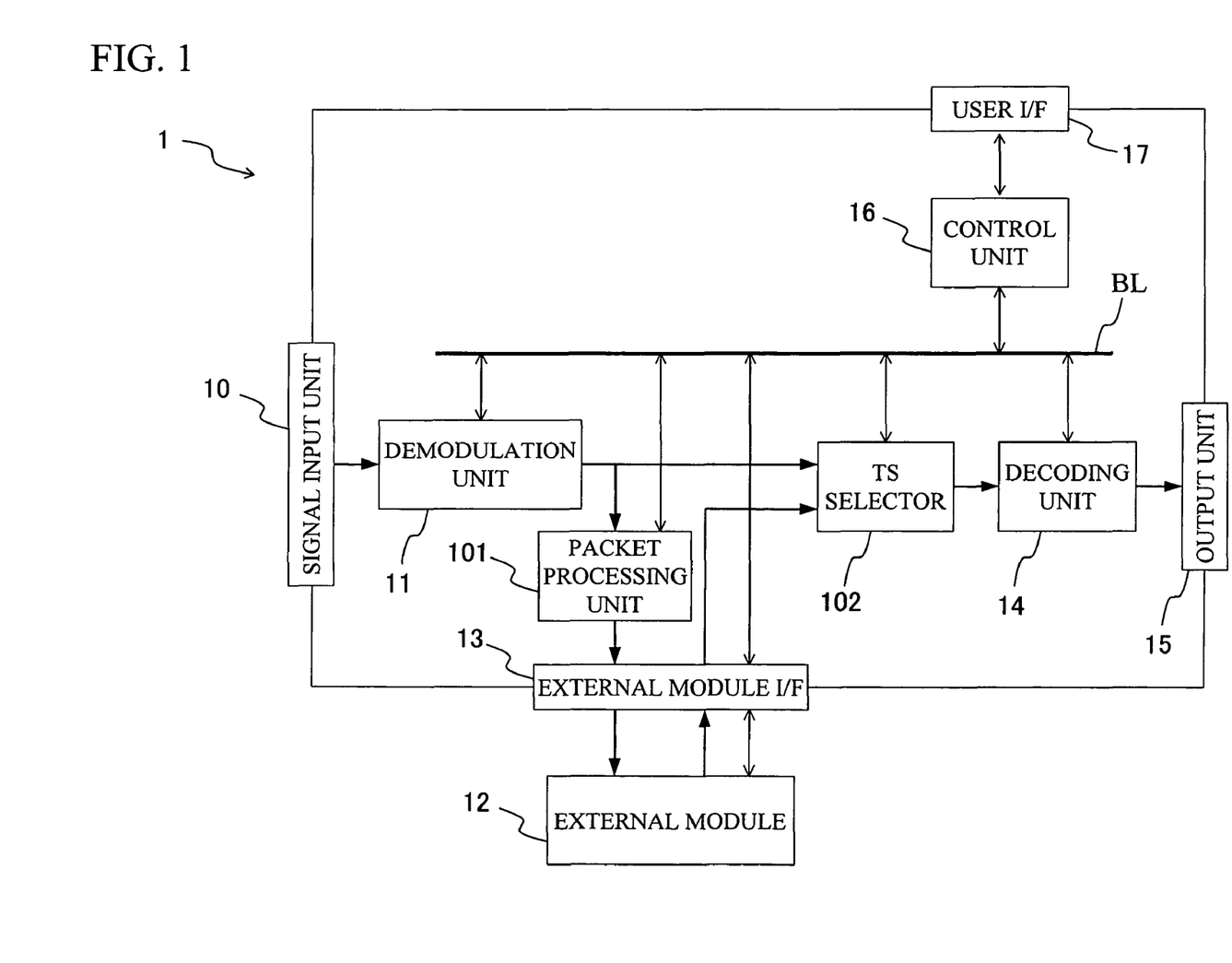
FIG. 1 shows a functional block diagram of a structural example of a digital broadcast receiver according to an embodiment of the present invention.
Figure 2:
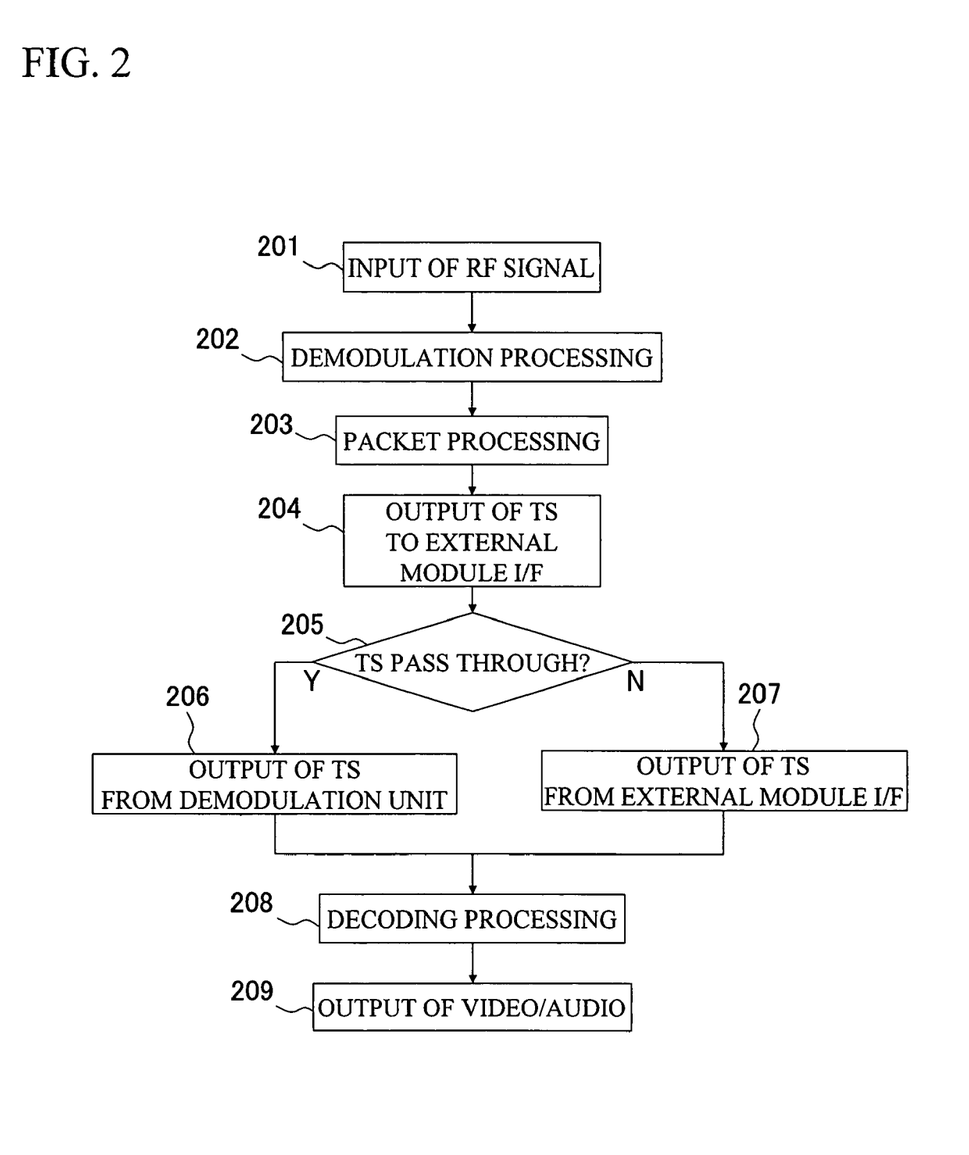
FIG. 2 shows a flowchart diagram of the flow of the operation of the digital broadcast receiver of FIG. 1.

FIG. 1 shows a functional block diagram of a structural example of a digital broadcast receiver according to an embodiment of the present invention. In FIG. 1, identical features that have already been described with reference to FIG. 9 are designated by identical reference numerals, and the descriptions thereof will be omitted. As shown in FIG. 1, to the digital broadcast receiver 1 according to the present embodiment, there are added: a packet processing unit 101 that is located between the demodulation unit 11 and the external module I/F 13, that monitors all the packets contained in a TS, and that performs a predetermined processing on packets matched with a predetermined condition; and a TS selector 102 that is located between the external module I/F 13 and a bus line BL and that selects and outputs one designated TS of the two TSs. FIG. 2 shows a flowchart diagram of the flow of the operation of FIG. 1. Each step will be described hereafter with reference to FIG. 1 as needed. As shown in FIG. 2, first, in a step 201, an RF signal received by an external antenna or the like is inputted to the signal input unit 10. In a step 202, the demodulation unit 11 performs tuning and demodulation processing on the inputted RF signal, and the TS including a selected channel designated by the control unit 16 is extracted. In a step 203, the packets contained in the TS extracted by the demodulation processing are monitored by the packet processing unit 101, the PIDs of packets matched with a predetermined condition are rewritten as 0x1FFF, and as a result, they are converted into invalid packets. Details of the predetermined condition will be described with reference to FIG. 3 and the subsequent figures thereof.

In a step 204, the TS processed in the step 203 is outputted to the external module 12 through the external module I/F 13. In a step 205, the control unit 16 determines whether or not the packets invalidated in the step 203 contain all or part of the selected target content. If all or part of the content is contained (Y), a TS pass-through instruction is issued and the flow proceeds to a step 206. If not contained (N), the TS pass-through instruction is canceled and the flow proceeds to a step 207. In the step 206, the TS selector 102 outputs the TS outputted from the demodulation unit 11 in a pass-through manner, without causing the TS to pass through the external module 12. On the other hand, in the step 207, the TS selected by the TS selector 102, which selects and outputs one designated TS of the two TSs, is outputted from the external module I/F 13. In either case, after the processing in the step 206 or 207 is completed, the flow proceeds to a step 208. In the step 208, the control unit 16 transmits channel selection information to the decoding unit 14, and if necessary, receives key information for decryption processing from the external module 12. The target content data is thus extracted from the TS. Next, in a step 209, based on the data extracted in the step 208, the output unit 15 outputs the video/audio of the target content.

Next, packet processing depending on the presence or absence of encryption will be described.

Figure 3:
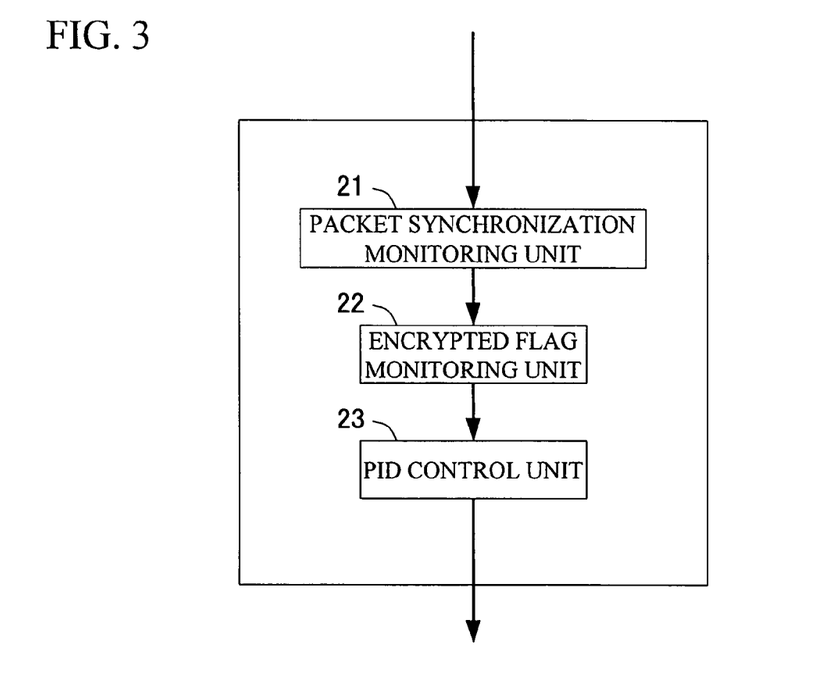
FIG. 3 shows a functional block diagram of a structural example of a packet processing unit of FIG. 1.

FIG. 3 shows an internal block diagram relating to the processing when the packet processing unit 101 of FIG. 1 according to the present embodiment invalidates the packets of a non-encrypted content. As shown in FIG. 3, the packet processing unit (101) according to the present embodiment comprises: a packet synchronization monitoring unit 21 that is synchronized with packet data; an encrypted flag monitoring unit 22 for obtaining flags indicating whether each packet is encrypted or non-encrypted and for detecting encrypted packets; and a PID control unit 23 for rewriting the PID of a packet to be invalidated as 0x1FFF.

Figure 4:
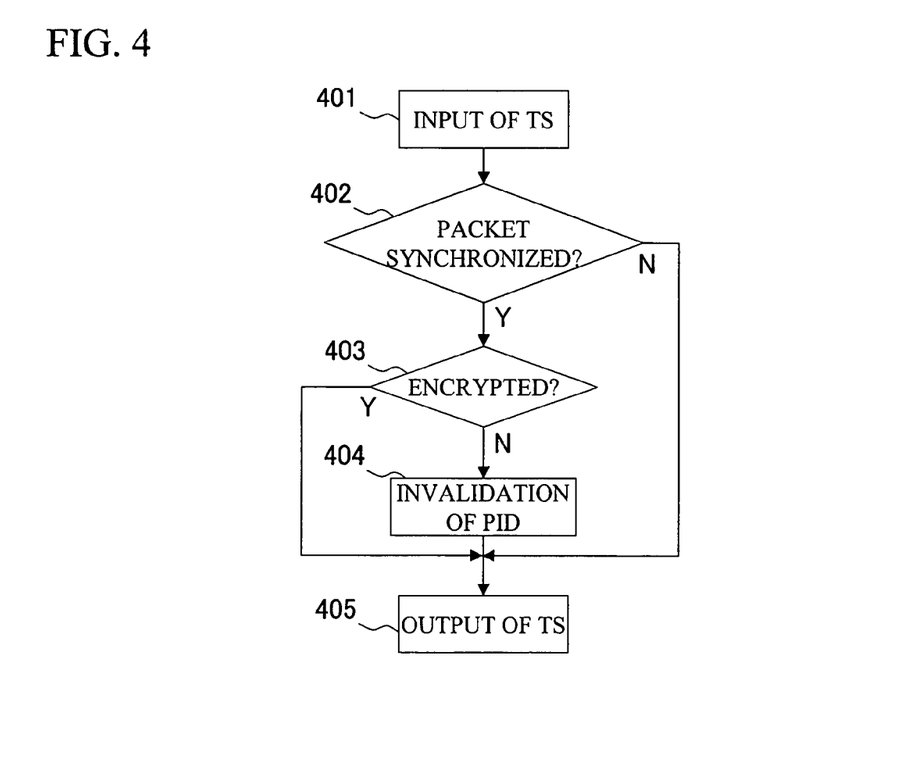
FIG. 4 shows a flowchart diagram of the flow of the operation of the packet processing unit of FIG. 3.

FIG. 4 shows a flowchart diagram of the flow of the operation of the packet processing unit (101) shown in FIG. 3. Each step will be described in the following. The explanation will be made with reference to FIG. 3 as needed. First, in a step 401, a TS is inputted. In a step 402, the packet synchronization monitoring unit 21 monitors the header portion of each of the packets contained in the inputted TS. If synchronized with the packet (Y), the flow proceeds to a step 403 for the next processing. If not synchronized with the packet (N), it is determined that no packets exist, and the flow proceeds to a step 405 to be described later. In the step 403, the encrypted flag monitoring unit 22 monitors encrypted flags and detects whether or not each packet is encrypted. If an encrypted packet is detected, no particular processing is performed, and the flow proceeds to the step 405. If a non-encrypted packet is detected, the flow proceeds to a step 404.

In the step 404, in order to invalidate the inputted packet, the PID control unit 23 rewrites the PID as 0x1FFF and then outputs the PID, and the flow proceeds to the step 405. In the step 405, an output is produced so that the delay of each of the packets caused by the above processes is maintained to be constant, and the TS is outputted so that no influence other than the rewriting of the PID is caused.

Next, packet processing due to PID designation will be described.

Figure 5:
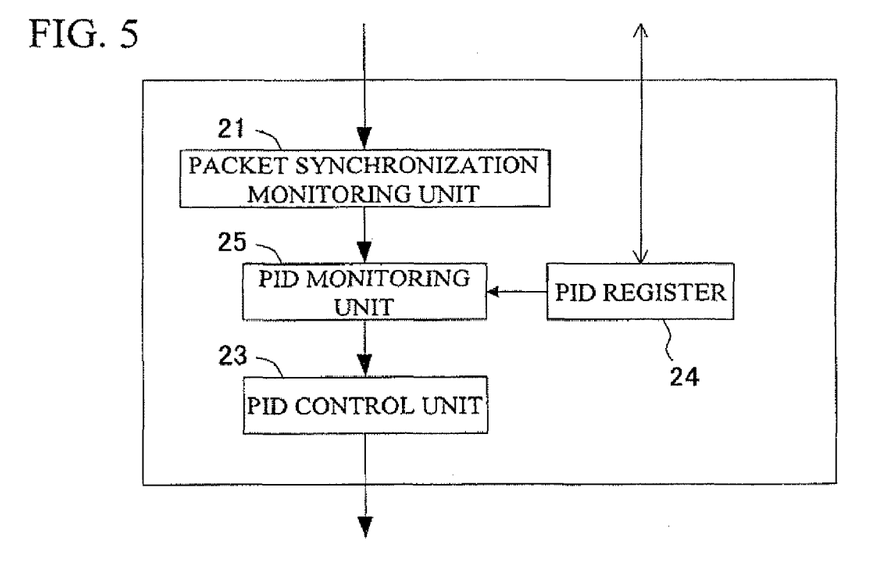
FIG. 5 shows a functional block diagram of a structural example of the packet processing unit of FIG. 1.

FIG. 5 shows an internal block diagram of the processing performed by the packet processing unit 101 shown in FIG. 1 in which a packet having a PID that matches one or a plurality of PIDs designated by the control unit 16 is invalidated. In FIG. 5, the features identical to those shown in FIG. 3 are designated by the identical reference numerals, and the descriptions thereof will be omitted.

A PID register 24 shown in FIG. 5 holds PIDs designated by the control unit 16, and a PID monitoring unit 25 monitors the PIDs of inputted packets and determines whether or not the PIDs match the PIDs set in the PID register 24.

Figure 6:
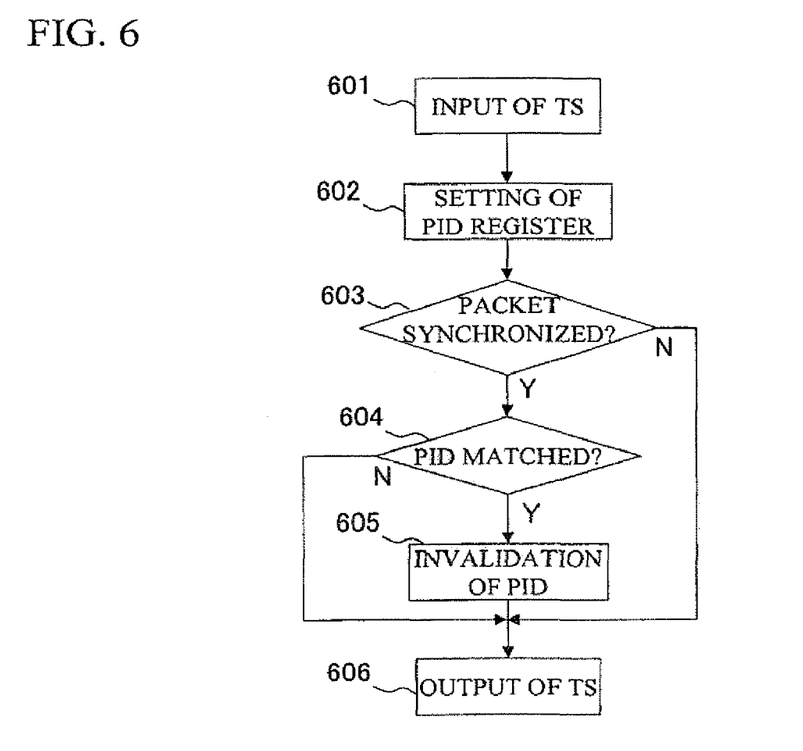
FIG. 6 shows a flowchart diagram of the flow of the operation of the packet processing unit of FIG. 5.

FIG. 6 shows a flowchart diagram of the operation of the structure shown in FIG. 5. Each step will be described in the following. In a step 601, first, a TS is inputted. In a step 602, the decoding unit 14 obtains information concerning the PIDs of the packets in the TS and information concerning content protection such as encryption/non-encryption, and the PIDs of the packets to be protected by invalidation are set in the PID register 24 via the control unit 16. In a step 603, the packet synchronization monitoring unit 21 monitors the header portion of each of the packets contained in the inputted TS. If synchronized with the packet (Y), the flow proceeds to a step 604 for the next processing. If not synchronized with the packet (N), it is determined that no packets exist, and the flow proceeds to a step 606.

In the step 604, it is determined whether or not the PIDs of the packets inputted to the PID monitoring unit 25 match the PIDs set in the PID register 24. If not matched (N), the flow proceeds to a step 606, and if matched (Y), the flow proceeds to the step 605. In the step 605, in order to invalidate the packets inputted, the PID control unit 23 rewrites the PIDs as 0x1FFF and then outputs the PIDs, and the flow proceeds to the step 606.

In the step 606, an output is produced so that the delay of each of the packets caused by the above processes is maintained to be constant, and the TS is outputted so that no influence other than the rewriting of the PID is caused.

Figure 7:
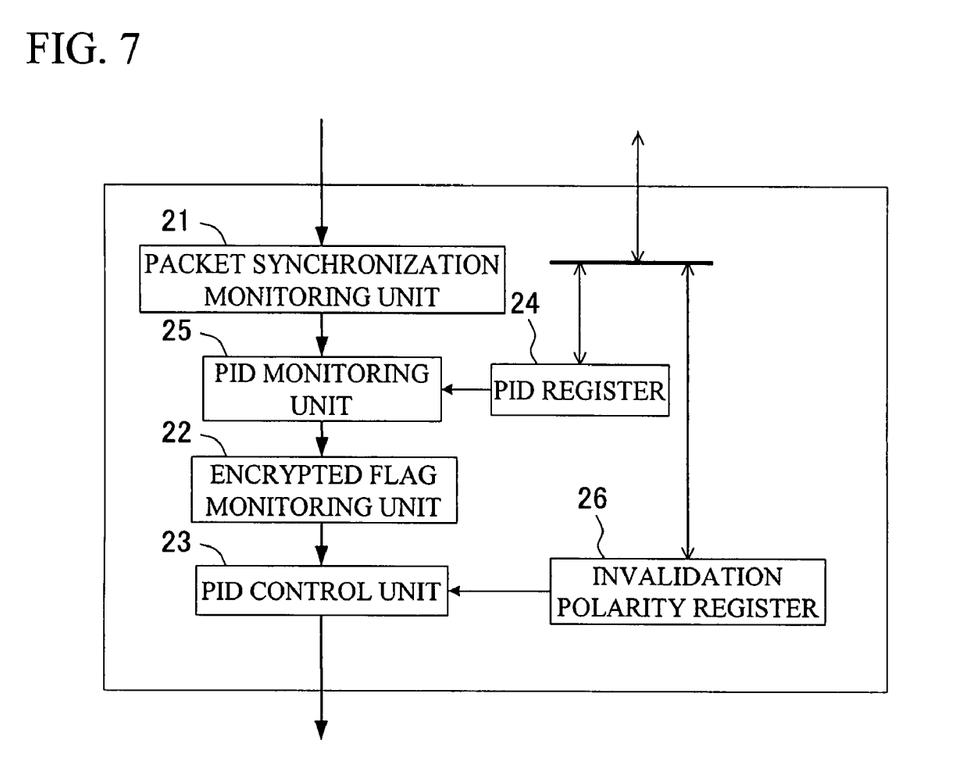
FIG. 7 shows a functional block diagram of a structural example of a packet processing unit of FIG. 1.

Next, packet processing due to PID designation and the presence or absence of encryption will be described. FIG. 7 shows an internal block structure when packets other than the encrypted packets of the packets designated by the control unit 16 are invalidated in the packet processing unit 101 of FIG. 1. In FIG. 7, portions identical to those shown in FIG. 3 and FIG. 5 are designated by the identical reference numerals, and the descriptions thereof will be omitted. As shown in FIG. 7, an invalidation polarity register 26 performs the setting of whether to invalidate the PIDs that match the PIDs set in the PID register 24 or to invalidate mismatched PIDs, and it holds the setting.

Figure 8:
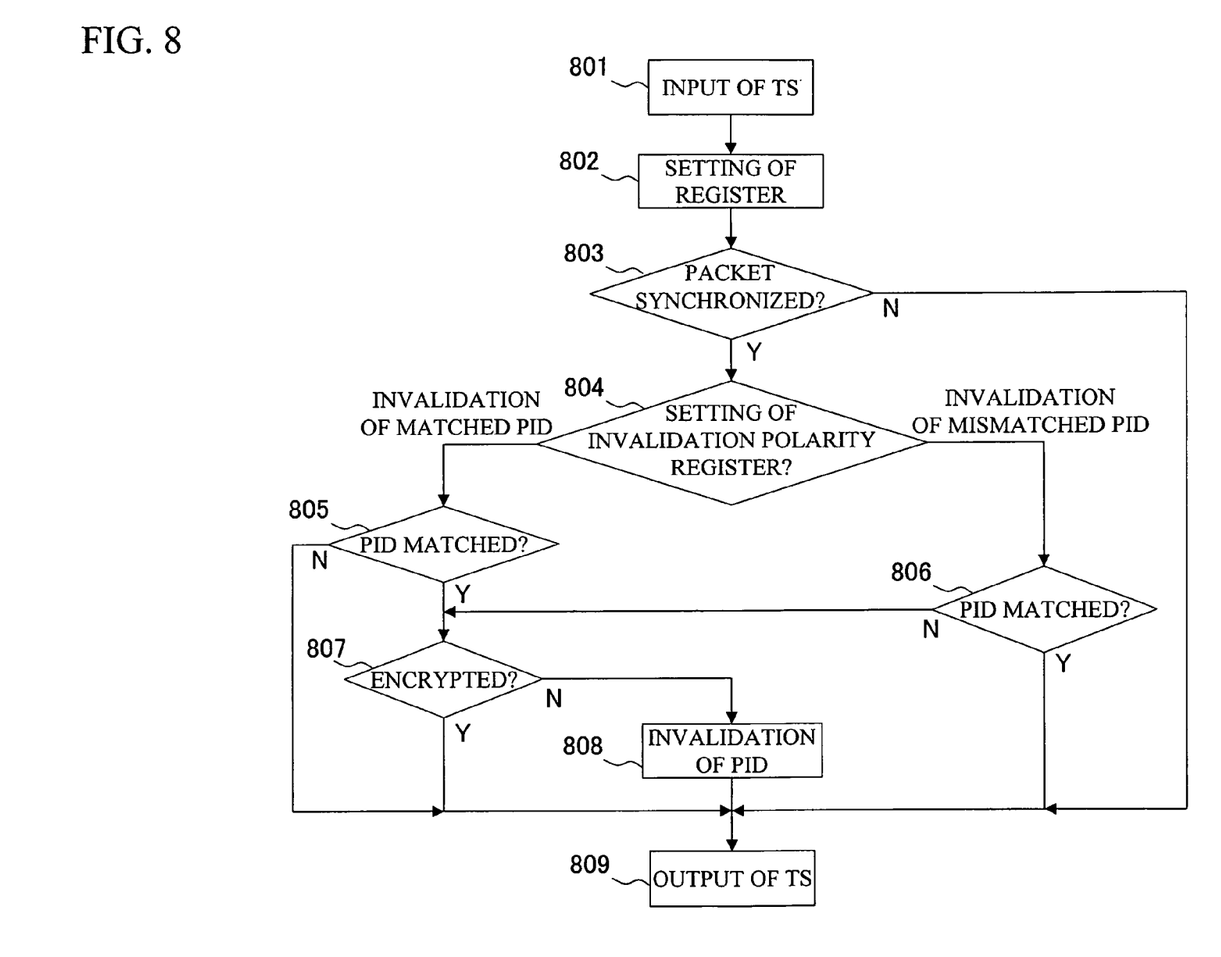
FIG. 8 shows a flowchart diagram of the flow of the operation of the packet processing unit of FIG. 7.

FIG. 8 shows a flowchart diagram of the operation based on the structure shown in FIG. 7. Each step will be described in the following. In a step 801, first, a TS is inputted. In a step 802, the control unit 16 performs the setting of one or a plurality of PIDs in the PID register 24 and the setting of whether to invalidate the packets having the PIDs that match the PIDs or to invalidate the packets having the mismatched PIDs in the invalidation polarity register 26, and the individual settings are changed when necessary. In a step 803, the header portion of each of the packets contained in the TS inputted is monitored by the packet synchronization monitoring unit 21. If synchronized with the packet (Y), the flow proceeds to a step 804 for the next processing. If not synchronized with the packet (N), it is determined that no packets exist, and the flow proceeds to a step 809.

In the step 804, determination is made based on the setting held in the invalidation polarity register 26 in the step 802. When matched PIDs are invalidated, the flow proceeds to a step 805, and when mismatched PIDs are invalidated, the flow proceeds to a step 806.

In the step 805, the PID monitoring unit 25 determines whether or not the synchronized packet PIDs in the step 803 match the PIDs set in the step 802. If matched (Y), the flow proceeds to a step 807, and if not matched (N), the flow proceeds to the step 809.

In the step 806, the PID monitoring unit 25 determines whether or not the synchronized packet PIDs in the step 803 match the PIDs set in the step 802. If matched (Y), the flow proceeds to the step 809, and if not matched (N), the flow proceeds to the step 807.

In the step 807, encrypted flags are monitored by the encrypted flag monitoring unit 22, so as to detect whether each packet is encrypted or not. If the packet is encrypted (Y), no particular processing is performed, and the flow proceeds to the step 809. If the packet is not encrypted (N), the flow proceeds to a step 808.

In the step 808, in order to invalidate the inputted packets, the PIDs are rewritten as 0x1FFF in the PID control unit 23, and they are then outputted. The flow then proceeds to the step 809.

In the step 809, an output is produced so that the delay of each of the packets caused by the above processes is maintained to be constant, and the TS is outputted so that no influence other than the rewriting of the PIDs is caused.

In the flowchart diagram shown in FIG. 8, while the operation varies depending on the setting, such setting switching operation is possible; that is, it is set not to invalidate non-encrypted packets other than contents, such as information necessary for selecting channels or the like and program information, immediately after reception, but to invalidate the PIDs of the packets other than the above packets, and after all the PIDs of the multiplexed non-encrypted content are obtained, those PIDs alone are invalidated.

Any of the above-described operations may be provided as a program executable by a computer.

Thus, according to the content protection system of the present embodiment, invalidation processing is performed on a content to be protected, such as a non-encrypted content contained in a TS that is outputted to an external module, and the processing is executed by changing a TS path based on the content selected. In this way, it is possible to provide an advantageous effect of improving security against unauthorized access with simple processing, without adversely affecting original audio-visual conditions.

Next, the content protection system based on various variations of the present embodiment will be briefly described.

1) According to a first embodiment of the present invention, a packet is invalidated by rewriting the PID thereof as an invalid value. However, other identification information may be invalidated. Alternatively, the entire packet may be rewritten or deleted.

2) Further, while an RF received by an external antenna or the like is inputted, a TS may be extracted from another signal, instead of such RF; an input may be directly received in the form of a TS. Furthermore, connection to the input unit may be distributed via CATV or the like, readout may be performed on a recording medium such as an HDD, or an input may be received via a network such as LAN.

3) Further, regarding the processing for invalidating unnecessary contents on a packet-by-packet basis, an interface is not limited to the external module. Other interfaces may be used for output preprocessing, such as cases in which the demodulation unit and the decoding unit are connected via a connector as separate modules. In such case, when a target content is a non-encrypted content, since a TS path cannot be switched and thus invalidation processing cannot be performed, the target content alone may be newly subjected to encryption processing, so as to perform invalidation processing on other contents multiplexed in the same TS.

4) The invention is not limited to the purpose of protecting contents from unauthorized access. For example, in an instrument in which age restriction is set, the invention may be used for processing such that it makes impossible to watch or listen to contents for which watching or listening is restricted, through invalidation processing.

As described above, according to the content protection system of the embodiment of the present invention, as a condition for determining whether a packet is subjected to invalidation processing, determination of encryption/non-encryption is made on a packet-by-packet basis. By invalidating non-encrypted packets alone, when the TS outputted to an external module is accessed in an unauthorized manner, unprotected non-encrypted contents can be protected.

Further, by designating the PIDs of a particular content and invalidating those packets, it becomes possible to prevent the extraction of an arbitrary content in an unauthorized manner, irrespective of encryption/non-encryption.

In contrast, by designating the PIDs other than those of a particular content and invalidating those packets, it becomes possible to prohibit unauthorized use of the contents other than the target content; that is, all the unnecessary contents contained in the TS.

Further, by using a combination of the invalidation processing performed on particular packets due to PID designation or on the packets other than the particular packets and the invalidation processing performed on non-encrypted packets, when invalidating non-encrypted contents, it becomes possible not to invalidate non-encrypted packets other than the contents, such as information for selecting channels or program information, as exceptions.

Further, when particular contents alone are invalidated, it becomes possible not to invalidate encrypted packets as exceptions. Thus, contents can be protected without causing a deficiency of necessary information in the external module or the decoding unit.

Furthermore, by performing invalidation processing on contents to which disadvantages could be caused due to unauthorized access on a packet-by-packet basis, the present invention is advantageous in that a content protection system in which increase in processing load or cost is reduced is easily established.

INDUSTRIAL APPLICABILITY

The present invention can be used for a content protection system in information processing equipment such as a digital broadcast receiver.

The invention claimed is:
1. A method, the method comprising:
demodulating a content composed of received digital data;
invalidating demodulated packets matched with a predetermined condition among the demodulated packets contained in demodulated data on which the demodulation processing is performed;
outputting the demodulated data including the invalidated demodulated packets to an external module that decodes only encrypted contents, the external module being outside of a content decoding apparatus;
determining whether or not a target content is contained in the invalidated demodulated packets;
passing-through the demodulated data not via the external module in cases in which the target content is contained in the invalidated demodulated packets, and receiving an output from the external module in cases in which the target content is not contained in the invalidated demodulated packets; and extracting the target content from the demodulated data and outputting the target content, wherein the method is performed by the content decoding apparatus comprising a register.

2. The method according to claim 1,
wherein the step of invalidating the demodulated packets matched with the predetermined condition among the demodulated packets contained in the demodulated data on which the demodulation processing is performed comprises invalidating the demodulated packets of a non-encrypted content, wherein the invalidation step comprises:

monitoring encrypted flags, so as to detect whether or not each demodulated packet is encrypted; and rewriting a PID with which the original data of the demodulated packet is distinguished, so as to invalidate the demodulated packet, when the demodulated packet is not encrypted.

3. The method according to claim 2, further comprising subsequently reducing influence other than that caused by the rewriting of the PID by producing an output while maintaining the delay of each demodulated packet due to the processes in the previous steps to be constant.

4. The method according to claim 1,
wherein the step of invalidating the demodulated packets matched with the predetermined condition among the demodulated packets contained in the demodulated data on which the demodulation processing is performed comprises invalidating the demodulated packets of a non-encrypted content, wherein the invalidation step comprises:

setting the PID of a packet to be protected by invalidation;
comparing the set PID with the PID of a demodulated packet; and
rewriting, when the comparison results are matched, the PID so as to invalidate the demodulated packet.

5. The method according to claim 4, further comprising subsequently reducing influence other than that caused by the rewriting of the PID by producing an output while maintaining the delay of each demodulated packet due to the processes in the previous steps to be constant.

6. A non-transitory storage medium for storing a program for causing a computer to execute the method according to claim 1.

7. A content decoding apparatus, comprising an information processing equipment comprising:

at least one processor and memory structured to:
demodulate a content composed of received digital data;
invalidate demodulated packets matched with a predetermined condition among the demodulated packets contained in demodulated data on which the demodulation processing is performed;
output the demodulated data including the invalidated demodulated packets to an external module that decodes only encrypted contents, the external module being outside of the content decoding apparatus;
determine whether or not a target content is contained in the invalidated demodulated packets;
pass-through the demodulated data not via the external module when the target content is contained in the invalidated demodulated packets, and receive an output from the external module when the target content is not contained in the invalidated demodulated packets; and
extract the target content from the demodulated data and arranged to output the target content.

8. The content decoding apparatus according to claim 7, wherein the processor and memory are structured to invalidate the demodulated packets matched with the predetermined condition among the demodulated packets contained in the demodulated data on which the demodulation processing is performed by invalidating the demodulated packets of a non-encrypted content, wherein the processor and memory are structured to invalidate the demodulated packets of the non-encrypted content by:

monitoring encrypted flags, so as to detect whether or not each demodulated packet is encrypted, and rewriting a PID with which the original data of the demodulated packet is distinguished, so as to invalidate the demodulated packet, when the demodulated packet is not encrypted.

9. The content decoding apparatus according to claim 8, wherein the processor and memory are structured to subsequently reduce influence other than that caused by the rewriting of the PID by producing an output while maintaining the delay of each demodulated packet due to the processes performed to invalidate the demodulated packets of the non-encrypted content to be constant.

10. The content decoding apparatus according to claim 7, wherein the processor and memory are structured to invalidate the demodulated packets matched with the predetermined condition among the demodulated packets contained in the demodulated data on which the demodulation processing is performed by invalidating the demodulated packets of a non-encrypted content, wherein the processor and memory are structured to invalidate the demodulated packets of the non-encrypted content by:

setting the PID of a packet to be protected by invalidation,
comparing the set PID with the PID of a demodulated packet, and
rewriting, when the comparison results are matched, the PID so as to invalidate the demodulated packet.

11. The content decoding apparatus according to claim 10, wherein the processor and memory are structured to subsequently reduce influence other than that caused by the rewriting of the PID by producing an output while maintaining the delay of each demodulated packet due to the processes performed to invalidate the demodulated packets of the non-encrypted content to be constant.

* * * * *